United States Patent
Deguchi et al.

(10) Patent No.: US 7,851,093 B2
(45) Date of Patent: Dec. 14, 2010

(54) NONAQUEOUS ELECTROLYTE FOR SECONDARY BATTERY AND SECONDARY BATTERY INCLUDING THE SAME

(75) Inventors: Masaki Deguchi, Osaka (JP); Tooru Matsui, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 736 days.

(21) Appl. No.: 11/792,246

(22) PCT Filed: Dec. 6, 2005

(86) PCT No.: PCT/JP2005/022345

§ 371 (c)(1),
(2), (4) Date: Jun. 20, 2007

(87) PCT Pub. No.: WO2006/067957

PCT Pub. Date: Jun. 29, 2006

(65) Prior Publication Data

US 2008/0138703 A1    Jun. 12, 2008

(30) Foreign Application Priority Data

Dec. 24, 2004  (JP) ............................. 2004-372810
Dec. 24, 2004  (JP) ............................. 2004-372811

(51) Int. Cl.
*H01M 6/16* (2006.01)
*H01M 6/18* (2006.01)

(52) U.S. Cl. ...................... 429/332; 429/322; 429/324; 429/326

(58) Field of Classification Search ................. 429/309, 429/306, 332, 322, 324, 326
See application file for complete search history.

(56) References Cited

U.S. PATENT DOCUMENTS

| 5,424,150 | A  | * | 6/1995 | Ohnishi et al. .............. 429/312 |
| 6,291,107 | B1 |   | 9/2001 | Shimizu |
| 6,682,856 | B1 | * | 1/2004 | Watanabe et al. ........... 429/326 |

FOREIGN PATENT DOCUMENTS

| JP | 11-273724   | 10/1999 |
| JP | 2000-299127 | 10/2000 |
| JP | 2002-298909 | 10/2002 |
| JP | 2004-259681 | 9/2004  |

OTHER PUBLICATIONS

Shinoda, N., et al., "Possibility of Trimethyl Phosphate as a Non-flammable Solvent for Lithium Ion Batteries", Electrochemical Society Proceedings, 2000, pp. 440-444, vol. 99-25.

* cited by examiner

*Primary Examiner*—Patrick Ryan
*Assistant Examiner*—Julian Mercado
(74) *Attorney, Agent, or Firm*—McDermott Will & Emery LLP

(57) ABSTRACT

A non-aqueous electrolyte for a secondary battery, including a non-aqueous solvent in which a solute is dissolved, a first additive and a second additive, wherein the first additive is a vinyl monomer having an electron donating group, the second additive is a carbonic acid ester having at least one carbon-carbon unsaturated bond, and an e value, which is a polarization factor of the vinyl monomer having an electron donating group, is a negative value.

5 Claims, 1 Drawing Sheet

US 7,851,093 B2

NONAQUEOUS ELECTROLYTE FOR SECONDARY BATTERY AND SECONDARY BATTERY INCLUDING THE SAME

RELATED APPLICATIONS

This application is the U.S. National Phase under 35 U.S.C. §371 of International Application No. PCT/JP2005/022345, filed on Dec. 6, 2005, which in turn claims the benefit of Japanese Application No. 2004-372810, filed on Dec. 24, 2004 and Japanese Application No. 2004-372811, filed on Dec. 24, 2004, the disclosures of which Applications are incorporated by reference herein.

TECHNICAL FIELD

The present invention relates to a non-aqueous electrolyte for a secondary battery and a secondary battery including the same.

BACKGROUND ART

At present, extensive studies are being carried out for non-aqueous electrolyte secondary batteries (secondary batteries including a non-aqueous electrolyte), in particular, lithium ion secondary batteries having high energy density at high voltages. Commonly, a lithium-containing transition metal oxide (e.g., $LiCoO_2$) is used as the positive electrode active material of a non-aqueous electrolyte secondary battery, and a carbon material is used as the negative electrode active material. As the non-aqueous electrolyte, a non-aqueous solvent in which a solute is dissolved is commonly used. As the non-aqueous solvent, a cyclic carbonic acid ester, a chain carbonic acid ester, a cyclic carboxylic acid ester or the like is used. As the solute, lithium hexafluorophosphate ($LiPF_6$), lithium tetrafluoroborate ($LiBF_4$) or the like is used.

From the viewpoint of improving the characteristics of the non-aqueous electrolyte secondary battery, particularly, the storage characteristics and the cycle characteristics, it is very important to control the interface reaction between the non-aqueous electrolyte and the electrode. Side reactions between the non-aqueous electrolyte and the electrode tend to occur especially at high temperatures. When the non-aqueous electrolyte is oxidatively decomposed or reductively decomposed on the surface of the electrode, a large amount of gas is generated to cause buckling (deformation) of the electrode group, so that there is the possibility that a short circuit may occur between the positive electrode and the negative electrode. When a gap is created between the positive electrode and the negative electrode owing to the gas generation, the charge/discharge reaction is impeded. Furthermore, when a side reaction occurs at the interface with the electrode, the impedance is increased, which significantly reduces the storage characteristics.

Attempts have been made to solve such problems by mixing an additive with the non-aqueous electrolyte.

Patent Document 1 suggests including a carboxylic acid vinyl ester such as vinyl acetate in the non-aqueous electrolyte. A carboxylic acid vinyl ester forms a passive film on the surface of a carbon material. The document described that the side reaction between the non-aqueous electrolyte and the negative electrode is therefore suppressed, improving the cycle characteristics and the storage characteristics of the battery.

Patent Document 2 suggests including tert-alkylbenzene such as tert-pentylbenzene in the non-aqueous electrolyte, and describes that this improves the cycle characteristics, the electrical capacity, the storage characteristics and the like of the lithium ion secondary battery.

Patent Document 3 suggests including an anionic-addition polymerizable monomer such as styrene in the non-aqueous electrolyte. An anionic-addition polymerizable monomer forms a film on the surface of a negative electrode comprising a carbon material during charging. The document describes that the side reaction between the non-aqueous electrolyte and the negative electrode is therefore suppressed, improving the cycle characteristics and the storage characteristics of the battery.

Patent Document 1: Laid-Open Patent Publication No. Hei 11-273724
Patent Document 2: Laid-Open Patent Publication No. 2002-298909
Patent Document 3: Laid-Open Patent Publication No. 2000-149989

DISCLOSURE OF THE INVENTION

Problem to be Solved by the Invention

Including a carboxylic acid vinyl ester in the non-aqueous electrolyte as suggested by Patent Document 1 causes not only formation of a film on the surface of the negative electrode, but also polymerization of the carboxylic acid vinyl ester on the surface of the positive electrode during charging, resulting in formation of a strong polymer film. This film suppresses the decomposition of the non-aqueous electrolyte, and thus improves the cycle characteristics at normal temperature. However, when the battery is stored at high temperatures, a large amount of gas is generated, degrading the rate characteristics after storage. The reason seems to be that a trace amount of moisture contained in the non-aqueous electrolyte saponifies the ester portion of the polymer film during high-temperature storage. By saponification, a polymer having a hydroxyl group in its side chain is produced. The hydroxyl group reacts with the solute (e.g., $LiPF_6$) in the non-aqueous electrolyte to produce a hydrofluoric acid (HF), which is a strong acid. The hydrofluoric acid promotes the transesterification reaction of the non-aqueous electrolyte. This seems to facilitate the progress of the oxidative decomposition or reductive decomposition of the non-aqueous electrolyte.

When tert-alkylbenzene is included in the non-aqueous electrolyte as suggested by Patent Document 2, if the battery is stored in a common charged state (e.g., the state of 4.2 V) at a high temperature, then not only the solvent in the non-aqueous electrolyte, but also a portion of tert-alkylbenzene is oxidatively decomposed, resulting in gas generation. Furthermore, the reaction product of tert-alkylbenzene has a high resistance, and increases the impedance of the positive electrode, thus degrading the rate characteristics after storage.

Including styrene in the non-aqueous electrolyte as suggested by Patent Document 3 causes not only formation of a film on the surface of the negative electrode, but also polymerization of styrene on the surface of the positive electrode during charging, resulting in formation of a polystyrene film that has no lithium ion conductivity at all. This film has a high resistance, and increases the impedance of the positive electrode, thus degrading the rate characteristics in the initial state and after storage.

Means for Solving the Problem

In view of the foregoing, it is an object of the present invention to suppress gas generation in a non-aqueous electrolyte secondary battery during high-temperature storage, thereby reducing degradation of the rate characteristics. Alternatively, it is an object of the invention to suppress gas generation in a non-aqueous electrolyte secondary battery during high-temperature storage, thereby reducing degradation of the rate characteristics, and achieving favorable cycle characteristics.

The present invention relates to a non-aqueous electrolyte for a secondary battery, comprising: a non-aqueous solvent in which a solute is dissolved; a first additive; and a second additive, wherein the first additive is a vinyl monomer having an electron donating group, the second additive is a carbonic acid ester having at least one carbon-carbon unsaturated bond, and an e value, which is a polarization factor of the vinyl monomer having an electron donating group, is a negative value.

Here, the polarization factor (e value) is based on the Q-e scheme proposed by Alfrey and Price in 1949. An e value represents the polarity of the monomer. The e value of the vinyl monomer having an electron donating group is a negative value. Therefore, the vinyl group has a high charge density, so that electrons are easily extracted. Accordingly, cationic polymerization reaction through electrolytic oxidation proceeds readily on the surface of the positive electrode. Consequently, a polymer film having a large molecular weight (polymerization degree) is formed on the surface of the positive electrode.

Examples of the e values of typical vinyl monomers having an electron donating group include styrene (e value=−0.80), α-methyl styrene (e value=−0.81), p-methyl styrene (e value=−0.63), p-methoxy styrene (e value=−1.40), vinyl propionate (e value=−0.68), vinyl butyrate (e value=−0.89) and vinyl benzoate (e value=−0.89) (see Q and e Values for Free Radical Copolymerizations of Vinyl Monomers and Telogens, Robert Z. Greenley, Polymer Handbook, 3rd ed. J. Brandrup, edited by E. H. Immergut, issued in 1989, II/p. 267 to II/p. 274).

The first additive and the second additive are each subjected to electrolytic oxidation on the positive electrode during charging, to cause polymerization reaction. As a result, a strong polymer film including a unit derived from the first additive and a unit derived from the second additive is formed on the surface of the positive electrode. This film is stable even at high temperatures, and has a low film resistance. Accordingly, the side reaction between the non-aqueous electrolyte and the positive electrode is suppressed at high temperatures, reducing gas generation and also degradation of the rate characteristics after high-temperature storage.

When only the first additive is included in the non-aqueous electrolyte, a stable polymer film cannot be formed on the surface of the positive electrode at high temperatures, or, the impedance of the positive electrode greatly increases. On the other hand, when only the second additive is included in the non-aqueous electrolyte, a polymer film having sufficient high-temperature stability cannot be formed on the surface of the positive electrode. Accordingly, the polymer film tends to be detached from the positive electrode at high temperatures, so that it is not possible to sufficiently suppress the side reaction between the non-aqueous electrolyte and the positive electrode.

It is preferable that the solute includes lithium tetrafluoroborate ($LiBF_4$). $LiBF_4$ decomposes on the negative electrode and the positive electrode to produce lithium fluoride (LiF). Lithium fluoride is incorporated into the unit derived from the first additive when a polymer film is formed on the surface of the positive electrode. Consequently, an inorganic-organic hybrid polymer film including lithium ion is formed.

Such a hybrid polymer film has lithium-ion conductivity. Accordingly, the intercalation and deintercalation reactions of lithium ion into and from the positive electrode proceed smoothly. As a result, the capacity recovery and the cycle characteristics after high-temperature storage improve. In addition, it is confirmed that the polymerization of a vinyl monomer having a negative e value at the positive electrode proceeds through cationic polymerization. The polymerization of the vinyl monomer having a negative e value at the negative electrode more easily proceeds for a large Q value, which represents the resonance stability. However, whether the polymerization at the negative electrode is anionic polymerization or radical polymerization is unknown. It is well known that the second additive forms a film not only on the surface of the positive electrode, but also on the surface of the negative electrode.

It is preferable that the vinyl monomer having an electron donating group is at least one selected from the group consisting of a carboxylic acid vinyl ester and a styrene derivative.

It is possible to use, for example, a carboxylic acid vinyl ester represented by the formula (1):

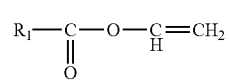

[Chemical Formula 1]

wherein $R_1$ represents an alkyl group having 2 to 11 carbon atoms, a halogenated alkyl group having 2 to 11 carbon atoms, or a cycloalkyl group having 3 to 6 carbon atoms or aryl group. In particular, it is preferable to use vinyl propionate.

When the first additive is the carboxylic acid vinyl ester represented by the formula (1), it is preferable that the second additive includes at least one selected from the group consisting of vinylene carbonate, vinyl ethylene carbonate and diallyl carbonate.

It is also possible to use, for example, a styrene derivative represented by the formula (2):

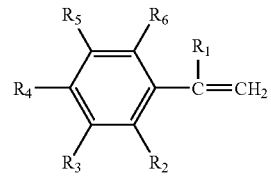

[Chemical Formula 2]

wherein $R_1$ to $R_6$ each independently represent an alkyl group having 1 to 5 carbon atoms, an alkoxy group having 1 to 5 carbon atoms, a halogen atom, or a hydrogen atom. Examples of the styrene derivative include styrene ($C_6H_5CH$$CH_2$), and it is particularly preferable to use styrene.

When the first additive is the styrene derivative, it is preferable that the second additive includes at least one selected from the group consisting of vinylene carbonate, vinyl ethylene carbonate and divinyl ethylene carbonate.

The present invention also relates to a secondary battery comprising: a positive electrode capable of absorbing and desorbing lithium; a negative electrode capable of absorbing and desorbing lithium; a separator interposed between the positive electrode and the negative electrode; and the above-described non-aqueous electrolyte.

Effect of the Invention

According to the present invention, the first additive and the second additive act synergistically on the surface of the positive electrode, so that it is possible to avoid gas generation and degradation of the rate characteristics even if the battery is stored at high temperatures. Accordingly, it is possible to provide a non-aqueous electrolyte secondary battery having favorable storage characteristics, or a non-aqueous electrolyte secondary battery having favorable storage characteristics and favorable cycle characteristics.

BEST MODE FOR CARRYING OUT THE INVENTION

Figure 1:
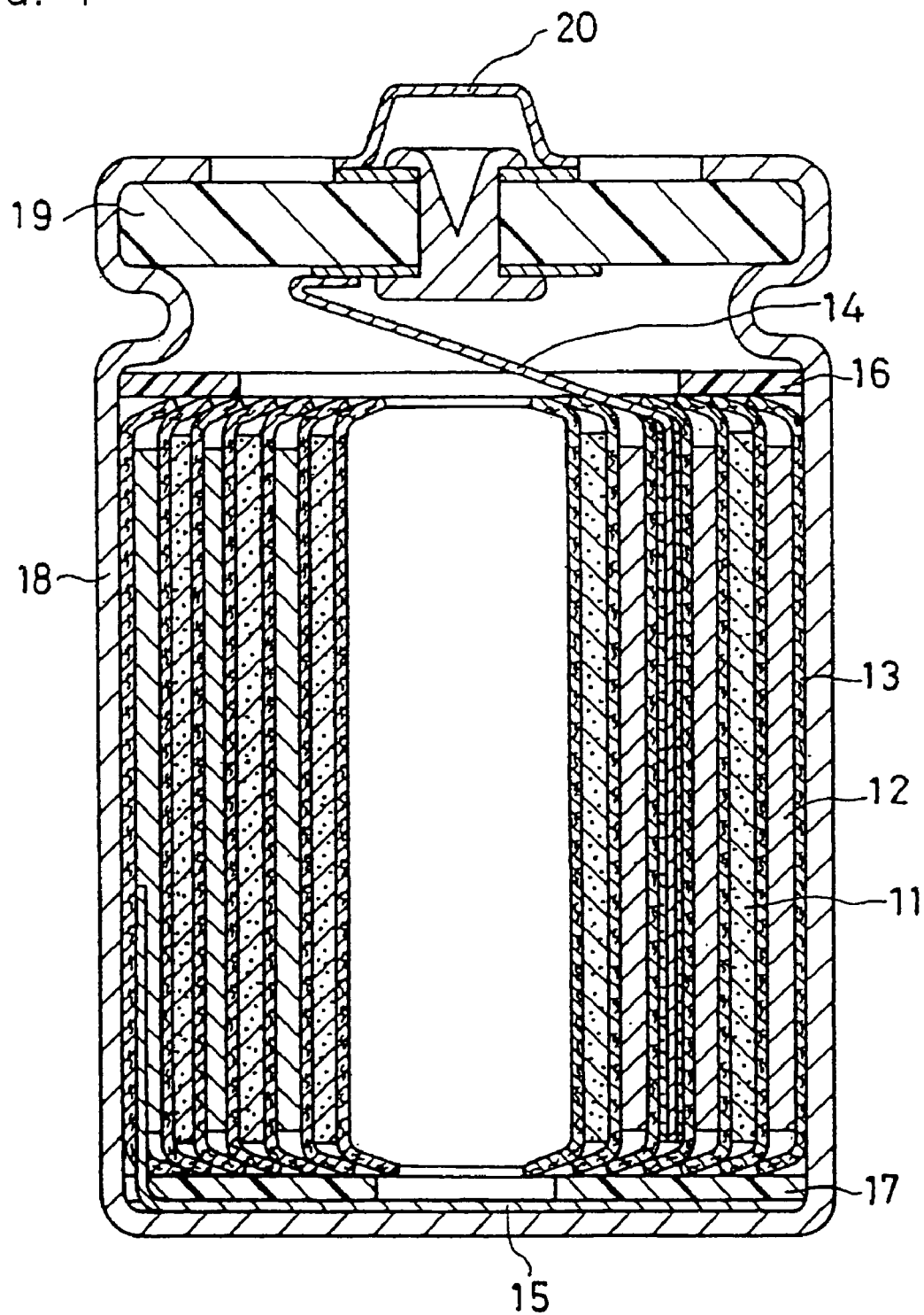
FIG. 1 is a vertical cross-sectional view showing a cylindrical non-aqueous electrolyte secondary battery according to examples of the present invention.

A non-aqueous electrolyte according to the present invention includes a non-aqueous solvent in which a solute is dissolved, a first additive, and a second additive. Here, the first additive is a vinyl monomer having an electron donating group, and the e value, which is the polarization factor, is a negative value. The second additive is a carbonic acid ester having at least one carbon-carbon unsaturated bond.

Although there is no particular limitation with respect to the kind of the vinyl monomer having an electron donating group, as long as the polarization factor (e value) is a negative value, it is possible to use, for example, at least one selected from the group consisting of a carboxylic acid vinyl ester and a styrene derivative. The first additive may be used singly or in combination of two or more of them.

Although there is no particular limitation with respect to the kind of the carboxylic acid vinyl ester, it is possible to use, for example, a carboxylic acid vinyl ester represented by the formula (1):

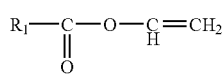

[Chemical Formula 3]

Here, in the formula (1), $R_1$, represents an alkyl group having 2 to 11 carbon atoms (preferably 2 to 3 carbon atoms), a halogenated alkyl group having 2 to 11 carbon atoms (preferably 2 to 3 carbon atoms), a cycloalkyl group having 3 to 6 carbon atoms or aryl group. The halogen atom included in the halogenated alkyl group is preferably a fluorine atom.

The carboxylic acid vinyl ester (the first additive) and the second additive are each subjected to electrolytic oxidation on the positive electrode during charging, thereby causing polymerization reaction. As a result, a strong polymer film is formed on the surface of the positive electrode. This film is stable even at high temperatures. Accordingly, the side reaction between the non-aqueous electrolyte and the positive electrode is suppressed at high temperatures, reducing gas generation and also degradation of the rate characteristics during high-temperature storage.

Here, the potential at which the carboxylic acid vinyl ester undergoes polymerization reaction is lower than the potential at which the second additive undergoes polymerization reaction. Accordingly, the carboxylic acid vinyl ester is polymerized on the positive electrode first, and then the second additive is polymerized such that it covers the carboxylic acid vinyl ester. That is, a polymer film having a two-layer structure is formed.

The inner layer of the polymer film having a two-layer structure comprises a unit derived from the carboxylic acid vinyl ester. The polymer of the inner layer forms a strong protective film on the surface of the positive electrode. On the other hand, the outer layer comprises a unit derived from the second additive. The outer layer prevents the ester portion of the inner layer from being saponified by a trace amount of moisture contained in the non-aqueous electrolyte. Furthermore, the adherence between the outer layer and the inner layer is high, so that the outer layer is more stable at high temperatures than when only the second additive is polymerized. Therefore, the polymer film having a two-layer structure stably exists on the surface of the positive electrode even at high temperatures. Accordingly, the side reaction between the non-aqueous electrolyte and the positive electrode can be suppressed even at high temperatures, reducing gas generation and also degradation of the rate characteristics.

Patent Document 1 also suggests including a carboxylic acid vinyl ester such as vinyl acetate in the non-aqueous electrolyte. However, when only the carboxylic acid vinyl ester is added to the non-aqueous electrolyte, the polymer produced on the surface of the positive electrode during charging is saponified by a trace amount of moisture contained in the non-aqueous electrolyte at high temperatures. As a result, a polymer having a hydroxyl group in its side chain is produced. The hydroxyl group reacts with an ordinary solute (e.g., $LiPF_6$) to produce HF, which is a strong acid. Accordingly, the transesterification reaction of the non-aqueous electrolyte is promoted during high-temperature storage, and the non-aqueous electrolyte is oxidateively decomposed or reductively decomposed, resulting in generation of a large amount of gas. Furthermore, the side reaction at the interface with the electrode increases the impedance, thus degrading the rate characteristics after storage. On the other hand, the polymer film having a two-layer structure is stable and strong even at high temperatures, so that it is possible to reduce gas generation during high-temperature storage, and also to suppress degradation of the rate characteristics.

Although there is no particular limitation with respect to the kind of the carboxylic acid vinyl ester, it preferably includes vinyl propionate. Vinyl propionate can be polymerized on the surface of the positive electrode to form a particularly strong polymer film.

When the first additive is the carboxylic acid vinyl ester, it is preferable that the second additive includes at least one selected from the group consisting of vinylene carbonate (VC), vinyl ethylene carbonate (VEC) and diallyl carbonate (DAC). Each of VC, VEC and DAC forms a particularly dense film through electrolytic polymerization. Therefore, use of these can improve the effect of protecting the inner layer by the outer layer in the polymer film having a two-layer structure.

Although there is no particular limitation with respect to the kind of the styrene derivative, it is possible to use, for example, a styrene derivative represented by the formula (2):

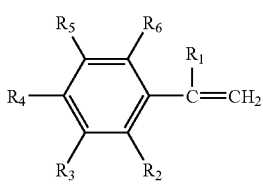

[Chemical Formula 4]

Here, in the formula (2), $R_1$, $R_2$, $R_3$, $R_4$, $R_5$ and $R_6$ each independently represent an alkyl group having 1 to 5 carbon atoms (preferably 1 to 2 carbon atoms), an alkoxy group having 1 to 5 carbon atoms (preferably 1 to 2 carbon atoms), a halogen atom (preferably a fluorine atom) or a hydrogen atom.

The styrene derivative (the first additive) and the second additive are each subjected to electrolytic oxidation on the surface of the positive electrode during charging, thereby causing polymerization reaction. As a result, a strong polymer film is formed on the surface of the positive electrode. This film is stable even at high temperatures, and also has high lithium-ion permeability. Accordingly, the side reaction between the non-aqueous electrolyte and the positive electrode is suppressed at high temperatures, thus reducing gas generation. Furthermore, the film has a low resistance, so that the intercalation and deintercalation reactions of lithium ion into and from the positive electrode proceed smoothly, also reducing degradation of the rate characteristics after high-temperature storage.

This polymer film is constituted by a unit derived from the styrene derivative, and a unit derived from the second additive. The unit derived from the styrene derivative is strong and has excellent high temperature stability, and therefore it will not be detached from the surface of the positive electrode even at high temperatures. Accordingly, it is possible to suppress the side reaction between the non-aqueous electrolyte and the positive electrode even at high temperatures. On the other hand, the unit derived from the second additive can incorporate therein the lithium ion deintercalated from the positive electrode when undergoing electrolytic polymerization during charging. Accordingly, the polymer film has very high lithium ion permeability, and a low film resistance. Therefore, the intercalation and deintercalation reactions of lithium ion into and from the positive electrode can be achieved smoothly. This polymer film can reduce gas generation during high-temperature storage, and also suppress degradation of the rate characteristics.

Patent Document 3 also suggests including styrene in the non-aqueous electrolyte. However, when only styrene is added to the non-aqueous electrolyte, a polystyrene film having excellent high temperature stability is formed on the surface of the positive electrode during charging. Although this film suppresses the side reaction between the non-aqueous electrolyte and the positive electrode, and thus reduces gas generation during high-temperature storage, it has no lithium ion conductivity at all. Accordingly, the polystyrene film creates a large resistance, and increases the impedance of the positive electrode, thus degrading the rate characteristics at the initial state and after storage. On the other hand, a composite polymer film including the unit derived from the styrene derivative and the unit derived from the second additive is stable and strong even at high temperatures, and also has excellent lithium ion conductivity. Accordingly, gas generation during high-temperature storage is reduced, and degradation of the rate characteristics is also suppressed.

In the styrene derivative represented by the formula (2), it is preferable that the atom or substituent bonded to the carbon atom in the β-position, that is, $R_1$ is a hydrogen atom. When a hydrogen atom, which is non-bulky, is bonded to the carbon atom in the β-position, steric hindrance at the time of electrolytic polymerization of the styrene derivative is reduced, so that polymerization reaction during charging can proceed easily. Consequently, a strong polymer film with a high polymerization degree is formed. Furthermore, a polymer film formed by electrolytic polymerization of styrene ($C_6H_5CH=CH_2$) is particularly excellent in high temperature stability, and has a great effect of suppressing the side reaction between the non-aqueous electrolyte and the positive electrode.

When the first additive is the styrene derivative, it is preferable that the second additive includes at least one selected from the group consisting of vinylene carbonate (VC), vinyl ethylene carbonate (VEC) and divinyl ethylene carbonate (DVEC). Each of VC, VEC and DVEC is polymerized on the surface of the positive electrode to produce a polymer. The lithium ion deintercalated from the positive electrode can be efficiently incorporated into the carbonic acid ester portion of this polymer. Consequently, a film having particularly high lithium ion conductivity is formed on the surface of the positive electrode.

There is no particular limitation with respect to the content ratio of the first additive and the second additive included in the non-aqueous electrolyte. However, the potential at which the first additive undergoes polymerization reaction is lower than the potential at which the second additive undergoes polymerization reaction. Therefore, the content of the first additive may be lower than that of the second additive. A compound that undergoes polymerization reaction at a low potential tends to be subjected to electrolytic oxidation to generate a radial. The generated radical serves as a polymerization initiator for a compound that undergoes polymerization reaction at a high potential. Accordingly, even if the amounts of the first additive and the second additive are small, a composite polymer film is efficiently produced at a low potential, so that the side reaction between the non-aqueous electrolyte and the positive electrode, which tends to occur at high voltages, can be reduced to a minimum. That is, since the polymerization reaction of the second additive proceeds when the first additive exists even in a small amount, a composite polymer is formed at the polymerization potential of the first additive. Accordingly, it is possible to suppress the side reaction when the potential is increased to the polymerization potential of the second additive. Additionally, the difference in the polymerization potential between the styrene derivative and the second additive is very small, so that it seems that a hybrid polymer film, rather than a polymer film having a two-layer structure, is produced when the first additive is the styrene derivative.

The amount of the first additive included in the non-aqueous electrolyte is preferably 0.005 to 5 parts by weight, more preferably 0.05 to 3 parts by weight, per 100 parts by weight of the non-aqueous solvent. The film resistance may increase when the content of the first additive is too large, and a sufficiently strong film may not be formed when the content is too small.

The amount of the second additive included in the non-aqueous electrolyte is preferably 0.5 to 10 parts by weight, more preferably 0.5 to 7 parts by weight, per 100 parts by weight of the non-aqueous solvent. When the content of the second additive is too large, the film may be too thick and the charge/discharge reaction may be impeded. When the content is too small, the effect of protecting the polymer film derived from the first additive, and the effect of providing lithium ion conductivity may be reduced.

There is no particular limitation with respect to the method for producing the polymer film during charging. For example, the polymer film can be sufficiently produced by a commonly-used constant current-constant voltage charging method. However, it is more preferable that the polymer film is produced by a pulse charging method. According to a pulse charging method, when pulses with a high voltage value are applied, the positive electrode potential immediately reaches the polymerization reaction potentials of the additives. Accordingly, the time during which the battery is subjected to a high voltage (that is, the voltage at which the side reaction between the non-aqueous electrolyte and the positive electrode tends to occur) is significantly shortened. As a result, formation of the polymer film proceeds promptly.

As the non-aqueous solvent for the non-aqueous electrolyte, it is possible to use, for example, a cyclic carbonic acid ester (excluding the second additive), a chain carbonic acid ester (excluding the second additive), and a cyclic carboxylic acid ester. Examples of the cyclic carbonic acid ester include propylene carbonate (PC) and ethylene carbonate (EC). Examples of the chain carbonic acid ester include diethyl carbonate (DEC), ethylmethyl carbonate (EMC) and dimethyl carbonate (DMC). Examples of the cyclic carboxylic acid ester include γ-butyrolactone (GBL) and γ-valerolactone (GVL). These may be used singly or in combination of two or more of them.

As the solute, a lithium salt is commonly used. Examples thereof include $LiClO_4$, $LiBF_4$, $LiPF_6$, $LiAlCl_4$, $LiSbF_6$, LiSCN, $LiCF_3SO_3$, $LiCF_3CO_2$, $Li(CF_3SO_2)_2$, $LiAsF_6$, $LiB_{10}Cl_{10}$, lithium lower aliphatic carboxylate, LiCl, LiBr, LiI, chloroboran lithium, borates such as lithium bis(1,2-benzenediolate(2-)-O,O')borate, lithium bis(2,3-naphthalenediolate(2-)-O,O')borate, lithium bis(2,2'-biphenyldiolate(2-)-O,O')borate and lithium bis(5-fluoro-2-olate-1-benzene sulfonate-O,O')borate, and imide salts such as bis(tetrafluoromethanesulfonyl)imide lithium $((CF_3SO_2)_2NLi)$, tetrafluoromethanesulfonyl nonafluorobutanesulfonyl imide lithium $(LiN(CF_3SO_2)(C_4F_9SO_2))$ and bis(pentafluoroethanesulfonyl)imide lithium $((C_2F_5SO_2)_2NLi)$. These may be used singly or in combination of two or more of them. In particular, it is preferable to use at least one selected from the group consisting of $LiBF_4$ and $LiPF_6$ as the solute. In the case of using $LiBF_4$ and $LiPF_6$ in combination for achieving a battery having well-balanced rate characteristics and the safety, the amount of $LiBF_4$ in the total of $LiBF_4$ and $LiPF_6$ is preferably 20 to 80 mol %.

A benzene derivative that deactivates the battery at the time of overcharge by decomposing to form a film on the electrode can be further included in the non-aqueous electrolyte. Examples of such a benzene derivative include a benzene derivative comprising a phenyl group and a cyclic compound group adjacent thereto. Here, it is preferable that the cyclic compound group is a phenyl group, a cyclic ether group, a cyclic ester group, a cycloalkyl group or a phenoxy group. Specific examples of the benzene derivative include cyclohexylbenzene, biphenyl and diphenyl ether. These may be used singly or in combination of two or more of them. The content of the benzene derivative in the whole non-aqueous electrolyte is preferably not more than 10 vol %.

A secondary battery according to the present invention includes: a positive electrode capable of absorbing and desorbing lithium; a negative electrode capable of absorbing and desorbing lithium; a separator interposed between the positive electrode and the negative electrode; and the above-described non-aqueous electrolyte. Although there is no particular limitation, the following materials may be used for the positive electrode, the negative electrode and the separator. There is also no particular limitation with respect to the form of the electrode group and the shape of the battery.

The positive electrode includes a positive electrode active material as its essential component, and a conductive material and a binder as its optional components. The positive electrode may comprise, for example, a positive electrode material mixture layer including a positive electrode active material, a binder and a conductive material, and a band-shaped positive electrode current collector supporting this layer. As the positive electrode active material, a lithium-containing transition metal oxide may be preferably used. For example, it is possible to use $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$ $Li_xMn_2O_4$ and $Li_xMn_{2-y}M_yO_4$ (M is at least one selected from the group consisting of Na, Mg, Sc, Y, Mn, Fe, Co, Ni, Cu, Zn, Al, Cr, Pb, Sb and B, $0<x\leq1.2$, $0\leq y\leq0.9$, $2\leq z\leq2.3$). However, the value of x is a value before starting charge/discharge, and increases or decreases during charge/discharge of the battery.

The negative electrode includes a negative electrode active material as its essential component, and a conductive material and a binder as its optional components. The negative electrode may comprise, for example, a negative electrode material mixture layer including a negative electrode active material and a binder, and a band-shaped negative electrode current collector supporting this layer. As the negative electrode active material, it is possible to use, for example, a carbon material, an oxide (e.g., silicon oxide or tin oxide), a nitride, an alloy (e.g., a silicon alloy or a tin alloy), a silicide, a tin compound, and lithium metal. As the carbon material, graphites such as natural graphite (e.g., flake graphite) and artificial graphite can be preferably used.

As the binder included in the positive electrode or the negative electrode, it is possible to use, for example, polyethylene, polypropylene, polytetrafluoroethylene (PTFE), polyvinylidene fluoride (PVDF), a tetrafluoroethylene-hexafluoropropylene copolymer (FEP), a vinylidene fluoride-hexafluoropropylene copolymer and styrene-butadiene rubber.

As the conductive material included in the positive electrode or the negative electrode, it is possible to use, for example, carbon blacks such as acetylene black, Ketjen Black, channel black, furnace black, lamp black and thermal black, and carbon fiber, graphite and metal fiber.

For the positive electrode current collector, it is possible to use, for example, a sheet (foil) comprising stainless steel, aluminum, titanium or the like. For the negative electrode current collector, it is possible to use, for example, a sheet (foil) comprising stainless steel, nickel, copper or the like. The thickness of the current collector is 1 to 500 μm, for example.

For the separator, a microporous thin film having high ion permeability, a predetermined mechanical strength, and insulating properties can be used. For example, it is possible to use a sheet, nonwoven fabric, woven fabric and the like comprising polyolefin such as polypropylene or polyethylene, or glass fiber. The thickness of the separator is usually 10 to 300 μm.

Example 1A (i) Preparation of Non-Aqueous Electrolyte

As a non-aqueous solvent, a mixed solvent containing ethylene carbonate (EC) and ethylmethyl carbonate (EMC) at a volume ratio of 1:4 was used. LiPF$_6$ serving as a solute was dissolved in this mixed solvent at a concentration of 1.0 mol/L.

Each of the first additives (carboxylic acid vinyl esters) listed in Table 1 and the second additive (VC) were added to the resulting solution, thus preparing a non-aqueous electrolyte. The amount of each of the first additives was 1 part by weight per 100 parts by weight of the non-aqueous solvent. The amount of the second additive was 2 parts by weight per 100 parts by weight of the non-aqueous solvent.

(ii) Production of Positive Electrode Plate

A positive electrode material mixture including 85 parts by weight of lithium cobaltate (LiCoO$_2$) powder serving as a positive electrode active material, 10 parts by weight of acetylene black serving as a conductive material and 5 parts by weight of polyvinylidene fluoride (PVDF) serving as a binder was dispersed in a proper amount of dehydrated N-methyl-2-pyrrolidone (NMP) to prepare a positive electrode material mixture slurry. This slurry was applied onto both sides of a positive electrode current collector comprising aluminum foil, and the whole was dried and then rolled to form a positive electrode material mixture layer. The positive electrode current collector supporting the positive electrode material mixture layer thereon was cut into a predetermined shape, thereby obtaining a positive electrode.

(iii) Production of Negative Electrode Plate

A negative electrode material mixture including 75 parts by weight of artificial graphite powder serving as a negative electrode active material, 20 parts by weight of acetylene black serving as a conductive material and 5 parts by weight of polyvinylidene fluoride serving as a binder was dispersed in an proper amount of NMP to prepare a negative electrode material mixture slurry. This slurry was applied onto both sides of a negative electrode current collector comprising copper foil, and the whole was dried and then rolled to form a negative electrode material mixture layer. The negative electrode current collector supporting the negative electrode material mixture layer thereon was cut into a predetermined shape, thereby obtaining a negative electrode.

(iv) Production of Cylindrical Batteries

Cylindrical non-aqueous electrolyte secondary batteries as shown in FIG. 1 were produced.

A positive electrode plate 11 and a negative electrode plate 12 were spirally wound, with a separator 13 interposed therebetween, to produce an electrode group. The electrode group was housed inside a battery base 18 made of nickel-plated iron. One end of a positive electrode lead 14 made of aluminum was connected to the positive electrode plate 11, and the other end thereof was connected to the rear side of a sealing plate 19 that is in electrical conduction with a positive electrode terminal 20. One end of a negative electrode lead 15 made of nickel was connected to the negative electrode plate 12, and the other end thereof was connected to the inner bottom surface of the battery case 18. Insulating plates 16 and 17 were respectively provided at the top and bottom portions of the electrode group. Then, a predetermined non-aqueous electrolyte was injected into the battery case 18. Thereafter, the opening of the battery case 18 was sealed with a sealing plate 19, thus completing a battery having a nominal capacity of 1500 mAh.

(v) Evaluation of Batteries

Amount of Gas Generation after Storage

Each battery was subjected to constant current-constant voltage charging with a maximum current of 1050 mA and an upper limit voltage of 4.2 V for two hours and thirty minutes under an environment with 20° C. (this charge condition is referred to as "condition X"). Thereafter, the battery was discharged with a constant current of 1500 mA under an environment with 20° C. until the battery reached an end voltage of 3.0 V, and a discharge capacity $C_1$ was measured.

Next, the battery was again subjected to constant current-constant voltage charging under the same condition X as described above. Thereafter, the charged battery was stored in an open-circuit state for 72 hours under an environment with 85%. The gas inside the battery was collected immediately after storage, and the amount was determined. The results are shown in Table 1.

Capacity Recovery Rate after Storage

Each of the batteries as stored above (the batteries different from the ones used for collecting the gas) was discharged with a constant current of 300 mA under an environment with 20° until the battery reached an end voltage of 3.0 V. Thereafter, the battery was subjected to constant current-constant voltage charging under the same condition X as described above. After a recess of 10 minutes, the battery was discharged with a constant current of 1500 mA until it reached an end voltage of 3.0 V, and a discharge capacity $C_2$ was measured. The ratio of the discharge capacity $C_2$ obtained after storage to the storage discharge capacity $C_1$ obtained before storage was determined in percentage, and shown as the capacity recovery rate. The results are shown in Table 1. It can be said that the better the capacity recovery rate was, the better the rate characteristics after high-temperature storage were.

Capacity Retention Rate after Cycling

A cycle in which the battery was subjected to constant current-constant voltage charging under the same condition X as described above, and thereafter, the battery was discharged with a constant current of 1500 mA under an environment with 20° C. until it reached an end voltage of 3.0 V was repeated 500 times. The ratio of a discharge capacity $C_{500}$ at the 500th cycle to a discharge capacity $C_3$ at the 3rd cycle was determined in percentage, and shown as the capacity retention rate. The results are shown in Table 1.

Comparative Example 1A

A battery was produced in the same manner as in Example 1A, except that the first additive and the second additives were not included in the non-aqueous electrolyte, and the battery was evaluated in the same manner.

Comparative Example 2A

A battery was produced in the same manner as in Example 1A, except that only the second additive (VC) was included in the non-aqueous electrolyte, without including the first additive, and the battery was evaluated in the same manner.

Comparative Example 3A

A battery was produced in the same manner as in Example 1A, except that only the first additive (vinyl propionate) was included in the non-aqueous electrolyte, without including the second additive, and the battery was evaluated in the same manner. The results are shown in Table 1.

Comparative Example 4A

A battery was produced in the same manner as in Example 1A, except that only the first additive (vinyl acetate) was included in the non-aqueous electrolyte, without including the second additive, and the battery was evaluated in the same manner.

The results of Comparative Examples 1A to 4A are shown in Table 1.

TABLE 1

|  | First additive | Second additive | Amount of gas generation (ml) | Capacity recovery rate (%) | Capacity retention rate (%) |
|---|---|---|---|---|---|
| Example 1A | vinyl propionate | VC | 0.3 | 87.5 | 86.7 |
|  | vinyl butyrate | VC | 0.7 | 85.3 | 86.0 |
|  | vinyl caproate | VC | 1.0 | 84.2 | 85.6 |
|  | vinyl caprylate | VC | 1.1 | 82.9 | 85.6 |
|  | vinyl caprate | VC | 1.2 | 82.3 | 85.1 |
|  | vinyl laurate | VC | 1.0 | 83.7 | 84.3 |
|  | vinyl pivalate | VC | 1.3 | 81.8 | 83.8 |
|  | vinyl cyclohexane-carboxylate | VC | 1.0 | 82.5 | 85.4 |
|  | vinyl 2-fluoropropionate | VC | 0.6 | 85.4 | 86.2 |
|  | vinyl 2,2,2-trifluoro-propionate | VC | 0.7 | 85.0 | 86.5 |
|  | vinyl benzoate | VC | 0.9 | 83.4 | 83.3 |
| Com. Ex. 1A | — | — | 3.7 | 52.1 | 46.3 |
| Com. Ex. 2A | — | VC | 3.5 | 51.0 | 81.1 |
| Com. Ex. 3A | vinyl propionate | — | 4.1 | 43.3 | 81.5 |
| Com. Ex. 4A | vinyl acetate | — | 4.8 | 36.8 | 80.9 |

Table 1 shows that the batteries exhibiting favorable storage characteristics and favorable cycle characteristics were obtained by including the first additive (carboxylic acid vinyl ester) and the second additive (carbonic acid ester having at least one carbon-carbon unsaturated bond) in the non-aqueous electrolyte. The reason seems to be that the first additive and the second additive cause polymerization reaction on the surface of the positive electrode during charging, thus forming a polymer film with a two-layer structure that is stable and strong even at high temperatures.

Table 1 shows that the battery exhibiting particularly excellent storage characteristics was obtained when using vinyl propionate (VPr) among the carboxylic acid vinyl esters. This seems to be because VPr formed a particularly strong polymer film through electrolytic polymerization, and thus improved the effect of suppressing the side reaction between the non-aqueous electrolyte and the positive electrode.

Example 2A

Batteries were produced in the same manner as in Example 1A, except that the amount of the first additive (VPr) per 100 parts by weight of the non-aqueous solvent was varied as shown in Table 2, and the batteries were evaluated in the same manner. The results are shown in Table 2.

TABLE 2

|  | vinyl propionate (parts by weight) | VC (parts by weight) | Amount of gas generation (ml) | Capacity recovery rate (%) | Capacity retention rate (%) |
|---|---|---|---|---|---|
| Example 2A | 0.001 | 2 | 3.1 | 66.5 | 81.3 |
|  | 0.005 | 2 | 1.6 | 81.0 | 82.4 |
|  | 0.01 | 2 | 1.2 | 82.3 | 83.9 |
|  | 0.05 | 2 | 0.8 | 84.8 | 85.0 |
|  | 0.1 | 2 | 0.5 | 85.9 | 85.8 |
|  | 1 | 2 | 0.3 | 87.5 | 86.7 |
|  | 3 | 2 | 0.3 | 83.1 | 84.2 |
|  | 5 | 2 | 0.2 | 80.4 | 81.9 |
|  | 10 | 2 | 0.2 | 62.2 | 73.3 |

Table 2 shows that the effect of reducing the amount of gas generation after storage increased with an increase in the amount of VPr. The capacity recovery rates after storage were also generally favorable. However, the capacity recovery rate decreased when the amount of VPr was too small or too large. Furthermore, the capacity retention rate after cycling also decreased when the amount of VPr was too large. From Table 2, it seems that the amount of the carboxylic acid vinyl ester serving as the first additive is preferably 0.005 to 5 parts by weight per 100 parts by weight of the non-aqueous solvent.

The strength of the polymer derived from VPr seems to be relatively low when the amount of VPr is too small. It seems that the film therefore tends to be detached from the surface of the positive electrode at high temperatures, so that the side reaction between the non-aqueous electrolyte and the positive electrode may not be sufficiently suppressed in some cases. Further, the reason that the capacity recovery rate after storage decreased seems to be that the impedance of the positive electrode was increased owing to the side reaction.

On the other hand, it seems that the capacity recovery rate after storage and the capacity retention rate after cycling reduced when the amount of VPr was too large, since the film resistance of the polymer derived from VPr increased, thus increasing the impedance of the positive electrode.

Example 3A

Batteries were produced in the same manner as in Example 1A, except that the kind of the second additive was varied as shown in Table 3, while fixing the kind of the first additive to VPr, and the batteries were evaluated in the same manner. The results are show in Table 3.

TABLE 3

|  | vinyl propionate (parts by weight) | Second additive* (parts by weight) | Amount of gas generation (ml) | Capacity recovery rate (%) | Capacity retention rate (%) |
|---|---|---|---|---|---|
| Example 3A | 1 | VC (2) | 0.3 | 87.5 | 86.7 |
|  | 1 | VEC (2) | 0.3 | 86.9 | 86.5 |
|  | 1 | DAC (2) | 0.4 | 86.6 | 86.2 |
|  | 1 | divinyl carbonate (2) | 0.5 | 81.2 | 85.3 |
|  | 1 | catechol carbonate (2) | 0.5 | 81.8 | 84.9 |
|  | 1 | DVEC(2) | 0.4 | 83.6 | 84.5 |
|  | 1 | phenylethylene carbonate (2) | 0.3 | 84.0 | 83.8 |
|  | 1 | phenylvinylene carbonate (2) | 0.5 | 82.1 | 83.3 |

TABLE 3-continued

| | vinyl propionate (parts by weight) | Second additive* (parts by weight) | Amount of gas generation (ml) | Capacity recovery rate (%) | Capacity retention rate (%) |
|---|---|---|---|---|---|
| Com. Ex. 5A | 0 | VC (2) | 3.5 | 51.0 | 81.1 |
| | 0 | VEC (2) | 3.7 | 50.3 | 80.8 |
| | 0 | DAC (2) | 3.7 | 50.8 | 80.8 |
| | 0 | VC (1) + VEC (1) | 3.5 | 50.5 | 81.5 |
| | 0 | VC (1) + VEC (1) + DAC (1) | 3.5 | 49.8 | 81.7 |

*Second additive: numbers in brackets represent parts by weight

Comparative Example 5A

Batteries were produced in the same manner as in Example 1A, except that the kind and the amount of the second additive were varied as shown in Table 3, without including the first additive in the non-aqueous electrolyte, and the batteries were evaluated in the same manner. The results are shown in Table 3.

Table 3 shows that the batteries exhibiting excellent storage characteristics were obtained when the non-aqueous electrolyte included the first additive and the second additive, regardless of the kind of the second additive. Furthermore, the capacity recovery rate after storage was particularly excellent when at least one selected from the group consisting of VC, VEC and DAC as the second additive. VC, VEC and DAC form a particularly dense film through electrolytic polymerization. This seems to have improved the effect of protecting the inner layer by the outer layer in the polymer film with a two-layer structure.

Example 4A

Batteries were produced in the same manner as in Example 1A, except that the kinds of the first additive and the second additive were varied as shown in Table 4, and the composition of the solute was varied as shown in Table 4, and the batteries were evaluated in the same manner. It should be noted that the concentration of the solute was fixed to 1 mol/L. The results are shown in Table 4.

Comparative Example 6A

Batteries were produced in the same manner as in Example 1A, except that the kind of the second additive was varied as shown in Table 4, without including the first additive in the non-aqueous electrolyte, and the solute was changed to $LiBF_4$, and the batteries were evaluated in the same manner. The results are shown in Table 4.

TABLE 4

| | $LiPF_6$ (mol/L) | $LiBF_4$ (mol/L) | First additive | Second additive | Amount of gas generation (ml) | Capacity recovery rate (%) | Capacity retention rate (%) |
|---|---|---|---|---|---|---|---|
| Example 4A | 1.0 | 0 | vinyl propionate | VC | 0.3 | 87.5 | 86.7 |
| | 0.75 | 0.25 | | | 0.2 | 88.2 | 87.1 |
| | 0.5 | 0.5 | | | 0.3 | 88.8 | 88.0 |
| | 0.25 | 0.75 | | | 0.3 | 89.7 | 89.2 |
| | 0 | 1.0 | | | 0.2 | 90.5 | 90.3 |
| | 1.0 | 0 | vinyl propionate | VEC | 0.3 | 86.9 | 86.5 |
| | 0.75 | 0.25 | | | 0.3 | 87.5 | 87.6 |
| | 0.5 | 0.5 | | | 0.4 | 88.8 | 88.3 |
| | 0.25 | 0.75 | | | 0.3 | 89.4 | 89.0 |
| | 0 | 1.0 | | | 0.4 | 90.0 | 89.7 |
| | 1.0 | 0 | vinyl propionate | DAC | 0.4 | 86.6 | 86.2 |
| | 0.75 | 0.25 | | | 0.4 | 87.1 | 87.3 |
| | 0.5 | 0.5 | | | 0.4 | 87.9 | 88.0 |
| | 0.25 | 0.75 | | | 0.5 | 88.6 | 89.1 |
| | 0 | 1.0 | | | 0.4 | 89.9 | 89.7 |
| | 1.0 | 0 | vinyl butyrate | VC | 0.7 | 85.3 | 86.0 |
| | 0.75 | 0.25 | | | 0.8 | 86.0 | 87.0 |
| | 0.5 | 0.5 | | | 0.6 | 87.1 | 87.7 |
| | 0.25 | 0.75 | | | 0.6 | 88.2 | 88.4 |
| | 0 | 1.0 | | | 0.7 | 88.7 | 89.3 |
| | 1.0 | 0 | vinyl 2-fluoropropionate | VC | 0.6 | 85.4 | 86.2 |
| | 0.75 | 0.25 | | | 0.6 | 86.3 | 87.2 |
| | 0.5 | 0.5 | | | 0.5 | 87.1 | 88.0 |
| | 0.25 | 0.75 | | | 0.5 | 87.7 | 88.6 |
| | 0 | 1.0 | | | 0.5 | 88.5 | 89.5 |
| | 1.0 | 0 | vinyl benzoate | VC | 0.9 | 83.4 | 83.3 |
| | 0.75 | 0.25 | | | 0.8 | 84.4 | 83.8 |
| | 0.5 | 0.5 | | | 0.9 | 85.2 | 84.6 |
| | 0.25 | 0.75 | | | 0.7 | 85.9 | 85.7 |
| | 0 | 1.0 | | | 0.8 | 86.6 | 87.4 |
| Com. Ex. 6A | 0 | 1.0 | — | VC | 3.7 | 50.7 | 80.4 |
| | 0 | 1.0 | — | VEC | 3.8 | 49.0 | 79.5 |
| | 0 | 1.0 | — | DAC | 3.9 | 50.0 | 79.6 |

Table 4 shows that each of the batteries in which the first additive and the second additive were included in the non-aqueous electrolyte, and $LiBF_4$ was further included in the solute was particularly excellent in the capacity recovery rate after storage and the cycle characteristics. When LiF, which is a decomposition product of $LiBF_4$, is incorporated into the polymer film formed by polymerization of the additives, an inorganic-organic hybrid polymer including lithium ion is formed. The reason that the capacity recovery rate after storage and the cycle characteristics improved seems to be that the polymer film was hybridized, thus improving the lithium ion conductivity.

Example 1B

Batteries were produced in the same manner as in Example 1A, except that the styrene derivatives listed in Table 5 were used as the first additive, and the amount of the gas generation after storage and the capacity recovery rate were evaluated in the same manner. The results are shown in Table 5.

Comparative Example 1B

A battery was produced in the same manner as in Example 1B, except that 1 part by weight of the first additive (styrene) per 100 parts by weight the non-aqueous solvent was only included in the non-aqueous electrolyte, without including the second additive, and the battery was evaluated in the same manner. The results are shown in Table 1.

Comparative Example 2B

A battery was produced in the same manner as in Example 1B, except that the first additive and the second additive were not included in the non-aqueous electrolyte, and 1 part by weight of tert-pentylbenzene per 100 parts by weight of the non-aqueous solvent was only included as the first additive, and the battery was evaluated in the same manner.

The results of Comparative Examples 1B and 2B are shown in Table 5.

TABLE 5

|  | First additive | Second additive | Amount of gas generation (ml) | Capacity recovery rate (%) |
|---|---|---|---|---|
| Example 1B | cis-β-methylstyrene | VC | 1.7 | 80.1 |
|  | trans-β-methylstyrene | VC | 1.6 | 80.3 |
|  | styrene | VC | 0.6 | 86.6 |
|  | α-methylstyrene | VC | 1.1 | 83.3 |
|  | α-methoxystyrene | VC | 1.0 | 84.3 |
|  | p-methylstyrene | VC | 1.2 | 83.0 |
|  | p-methoxystyrene | VC | 0.9 | 84.8 |
|  | m-chlorostyrene | VC | 1.2 | 82.5 |
|  | m-bromostyrene | VC | 1.3 | 82.1 |
|  | 2,4,6-trimethylstyrene | VC | 1.2 | 82.7 |
| Com. Ex. 1B | styrene | — | 0.5 | 20.6 |
| Com. Ex. 2B | tert-pentylbenzene | — | 4.6 | 31.3 |

Table 5 shows that including the first additive (styrene derivative) and the second additive (carbonic acid ester having at least one carbon-carbon unsaturated bond) in the non-aqueous electrolyte not only reduced the amount of gas generation after storage, but also provided the batteries exhibiting favorable capacity recovery rate after storage. The reason seems to be that the first additive and the second additive caused polymerization reaction on the surface of the positive electrode during charging, thus forming a polymer film having both high temperature stability and lithium ion conductivity at the same time.

Table 5 shows that cis-β-methyl styrene and trans-β-methyl styrene provided a relatively small effect of improving the storage characteristics. The reason seems to be that a methyl group, which is bulky, is bonded to the carbon atom in the β-position in these methyl styrenes. On the other hand, only a hydrogen atom is bonded to the carbon atom in the β-position in the rest of the styrene derivatives, so that the steric hindrance at the time of electrolytic polymerization is reduced. This seems to have facilitated the polymerization reaction of the styrene derivative, thus forming a strong polymer film with a high degree of polymerization, and also increasing the effect of improving the storage characteristics.

Table 5 shows that, among the styrene derivatives in which a hydrogen atom is bonded to the carbon atom in the β-position, styrene is particularly effective in improving the storage characteristics. It seems that a polymer film formed by styrene through electrolytic polymerization has particularly excellent high temperature stability, and therefore provides a great effect of suppressing the side reaction between the non-aqueous electrolyte and the positive electrode.

Example 2B

Batteries were produced in the same manner as in Example 1B, except that the amount of the first additive (styrene) per 100 parts by weight of the non-aqueous solvent was varied as shown in Table 6, and the batteries were evaluated in the same manner. The results are shown in Table 6.

TABLE 6

|  | styrene (parts by weight) | VC (parts by weight) | Amount of gas generation (ml) | Capacity recovery rate (%) |
|---|---|---|---|---|
| Example 2B | 0.001 | 2 | 3.0 | 73.8 |
|  | 0.005 | 2 | 1.3 | 80.5 |
|  | 0.01 | 2 | 1.1 | 83.0 |
|  | 0.05 | 2 | 0.8 | 85.8 |
|  | 0.1 | 2 | 0.7 | 86.3 |
|  | 1 | 2 | 0.6 | 86.6 |
|  | 3 | 2 | 0.4 | 82.1 |
|  | 5 | 2 | 0.3 | 81.9 |
|  | 10 | 2 | 0.3 | 64.7 |

Table 6 shows that the effect of reducing the amount of gas generation after storage increased with an increase in the amount of styrene. The capacity recovery rates after storage were also generally favorable. However, the capacity recovery rate decreased when the amount of styrene was too small or too large. From Table 6, it seems that the amount of the styrene derivative serving as the first additive is preferably 0.005 to 5 parts by weight per 100 parts by weight the non-aqueous solvent.

The high temperature stability of the polymer film seems to be relatively low when the amount of styrene is too small. It seems that the film therefore tends to be detached from the surface of the positive electrode, so that the side reaction between the non-aqueous electrolyte and the positive electrode may not be sufficiently suppressed in some cases. Further, the reason that the capacity recovery rate after storage decreased seems to be that the impedance of the positive electrode was increased owing to the side reaction.

On the other hand, it seems that the capacity recovery rate after storage decreased when the amount of styrene was too large, since the lithium ion conductivity of the polymer film decreased and the resistance was therefore increased, increasing the impedance of the positive electrode.

Example 3B

Batteries were produced in the same manner as in Example 1B, except that the kind and the amount of the second additive were varied as shown in Table 7, while fixing the kind of the first additive to styrene, and the batteries were evaluated in the same manner. The results are show in Table 7.

TABLE 7

|  | vinyl propionate (parts by weight) | Second additive* (parts by weight) | Amount of gas generation (ml) | Capacity recovery rate (%) |
|---|---|---|---|---|
| Example 3B | 1 | 1,3-dioxo-4-cyclohexene-2-on (2) | 0.7 | 81.8 |
|  | 1 | 1,3-dioxo-4-cycloheptene-2-on (2) | 0.6 | 80.9 |
|  | 1 | VC (2) | 0.6 | 86.6 |
|  | 1 | VEC (2) | 0.7 | 85.2 |
|  | 1 | DVEC (2) | 0.9 | 85.0 |
|  | 1 | VC (1) + VEC (1) | 0.6 | 86.3 |
|  | 1 | VC (1) + VEC (1) + DVEC (1) | 0.6 | 85.7 |
| Com. Ex. 3B | 0 | DVEC (2) | 3.8 | 48.9 |
|  | 0 | VC (1) + VEC (1) + DVEC (1) | 3.6 | 49.1 |

*Second additive: numbers in brackets represent parts by weight

Comparative Example 3B

Batteries were produced in the same manner as in Example 1B, except that the kind and the amount of the second additive were varied as shown in Table 7, without including the first additive in the non-aqueous electrolyte, and the batteries were evaluated in the same manner. The results are shown in Table 7.

Table 7 shows that the batteries exhibiting excellent storage characteristics were obtained when the non-aqueous electrolyte included the first additive and the second additive, regardless of the kind of the second additive. Furthermore, the storage characteristics were particularly excellent when at least one selected from the group consisting of VC, VEC and DVEC as the second additive. Polymer films formed on the surface of the positive electrode by VC, VEC and DVEC having a 5-membered ring structure can efficiently incorporate the lithium ion deintercalated from the positive electrode into the carbonic acid ester portion. It seems that the lithium ion conductivity of the polymer film therefore increased, thus increasing the effect of improving the storage characteristics.

Example 4B

Batteries were produced in the same manner as in Example 1B, except that the kinds of the first additive and the second additive were varied as shown in Table 8, and the composition of the solute was varied as shown in Table 8, and the batteries were evaluated in the same manner. It should be noted that the concentration of the solute was fixed to 1 mol/L. The results are shown in Table 8.

TABLE 8

|  | $LiPF_6$ (mol/L) | $LiBF_4$ (mol/L) | First additive | Second additive | Amount of gas generation (ml) | Capacity recovery rate (%) |
|---|---|---|---|---|---|---|
| Example 4B | 1.0 | 0 | styrene | VC | 0.6 | 86.6 |
|  | 0.75 | 0.25 |  |  | 0.6 | 87.3 |
|  | 0.5 | 0.5 |  |  | 0.7 | 88.1 |
|  | 0.25 | 0.75 |  |  | 0.6 | 88.9 |
|  | 0 | 1.0 |  |  | 0.7 | 90.1 |
|  | 1.0 | 0 | styrene | VEC | 0.7 | 85.2 |
|  | 0.75 | 0.25 |  |  | 0.8 | 86.2 |
|  | 0.5 | 0.5 |  |  | 0.6 | 87.5 |
|  | 0.25 | 0.75 |  |  | 0.8 | 88.1 |
|  | 0 | 1.0 |  |  | 0.7 | 89.0 |
|  | 1.0 | 0 | styrene | DVEC | 0.9 | 85.0 |
|  | 0.75 | 0.25 |  |  | 0.7 | 85.8 |
|  | 0.5 | 0.5 |  |  | 0.9 | 86.8 |
|  | 0.25 | 0.75 |  |  | 0.8 | 87.2 |
|  | 0 | 1.0 |  |  | 0.8 | 88.6 |
|  | 1.0 | 0 | α-methyl-styrene | VC | 1.1 | 83.3 |
|  | 0.75 | 0.25 |  |  | 1.0 | 84.1 |
|  | 0.5 | 0.5 |  |  | 1.0 | 85.0 |
|  | 0.25 | 0.75 |  |  | 1.2 | 85.8 |
|  | 0 | 1.0 |  |  | 1.2 | 87.0 |
|  | 1.0 | 0 | p-methyl-styrene | VC | 1.2 | 83.0 |
|  | 0.75 | 0.25 |  |  | 1.2 | 84.0 |
|  | 0.5 | 0.5 |  |  | 1.3 | 85.1 |
|  | 0.25 | 0.75 |  |  | 1.3 | 85.9 |
|  | 0 | 1.0 |  |  | 1.1 | 86.9 |
|  | 1.0 | 0 | p-methoxy-styrene | VC | 0.9 | 84.8 |
|  | 0.75 | 0.25 |  |  | 0.7 | 85.7 |
|  | 0.5 | 0.5 |  |  | 0.8 | 86.5 |
|  | 0.25 | 0.75 |  |  | 0.8 | 87.7 |
|  | 0 | 1.0 |  |  | 0.9 | 89.0 |
| Com. Ex. 4B | 0 | 1.0 | — | DVEC | 3.9 | 48.6 |

Comparative Example 4B

A battery was produced in the same manner as in Example 1B, except that the first additive was not included in the non-aqueous electrolyte, the second additive was changed to divinyl ethylene carbonate (DVEC), and the solute was changed to $LiBF_4$, and the battery was evaluated in the same manner. The results are shown in Table 8.

Table 8 shows that each of the batteries in which the first additive (styrene derivative) and the second additive were included in the non-aqueous electrolyte, and $LiBF_4$ was further included in the solute exhibited a particularly excellent capacity recovery rate after storage. The reason seems to be that an inorganic-organic hybrid polymer film having excellent lithium ion conductivity was formed on the surface of the positive electrode.

INDUSTRIAL APPLICABILITY

The present invention is generally applicable to non-aqueous electrolytes used for secondary batteries. According to the invention, it is possible to suppress gas generation in a non-aqueous electrolyte secondary battery during high-temperature storage, thus reducing degradation of the rate characteristics. Moreover, it is possible to achieve favorable cycle characteristics. The present invention is also applicable to small batteries used for small portable devices, and large batteries used for electrical cars and the like. The non-aqueous electrolyte secondary battery of the present invention can be used for the power sources for mobile information terminals, mobile electronic devices, small electrical energy storage devices for household use, motorcycles, electric cars and hybrid electric cars, for example. However, there is no particular limitation with respect to its applications.

The invention claimed is:

1. A non-aqueous electrolyte for a secondary battery, comprising:
   a non-aqueous solvent in which a solute is dissolved;
   a first additive; and
   a second additive,
   wherein said first additive is a vinyl monomer represented by the formula (I):

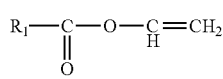 [Chemical Formula 1]

wherein $R_1$ represents an alkyl group having 2 to 11 carbon atoms, a halogenated alkyl group having 2 to 11 carbon atoms, a cycloalkyl group having 3 to 6 carbon atoms or aryl group, and having an electron donating group,
   said second additive is a carbonic acid ester having at least one carbon-carbon unsaturated bond, and
   an e value, which is a polarization factor of said vinyl monomer, is a negative value.

2. The non-aqueous electrolyte in accordance with claim 1, wherein said solute includes lithium tetrafluoroborate ($LiBF_4$).

3. The non-aqueous electrolyte in accordance with claim 1, wherein said vinyl monomer includes vinyl propionate.

4. The non-aqueous electrolyte in accordance with claim 1, wherein said second additive includes at least one selected from the group consisting of vinylene carbonate, vinyl ethylene carbonate and diallyl carbonate.

5. A secondary battery comprising:
   a positive electrode capable of absorbing and desorbing lithium;
   a negative electrode capable of absorbing and desorbing lithium;
   a separator interposed between said positive electrode and said negative electrode; and
   the non-aqueous electrolyte according to claim 1.

* * * * *

UNITED STATES PATENT AND TRADEMARK OFFICE
CERTIFICATE OF CORRECTION

PATENT NO. : 7,851,093 B2  Page 1 of 1
APPLICATION NO. : 11/792246
DATED : December 14, 2010
INVENTOR(S) : Masaki Deguchi et al.

It is certified that error appears in the above-identified patent and that said Letters Patent is hereby corrected as shown below:

On the title page, below the data for Item "(86) PCT No.: PCTJP2005/022345" and before Item "(87)", change the following:

-- § 371 (c)(1), (2), (4) Date: June 4, 2007. --

Signed and Sealed this
Nineteenth Day of April, 2011

David J. Kappos
*Director of the United States Patent and Trademark Office*